(No Model.)
C. R. GOODMAN.
APPARATUS FOR LAYING RAILROAD TRACKS.
No. 312,626. Patented Feb. 24, 1885.
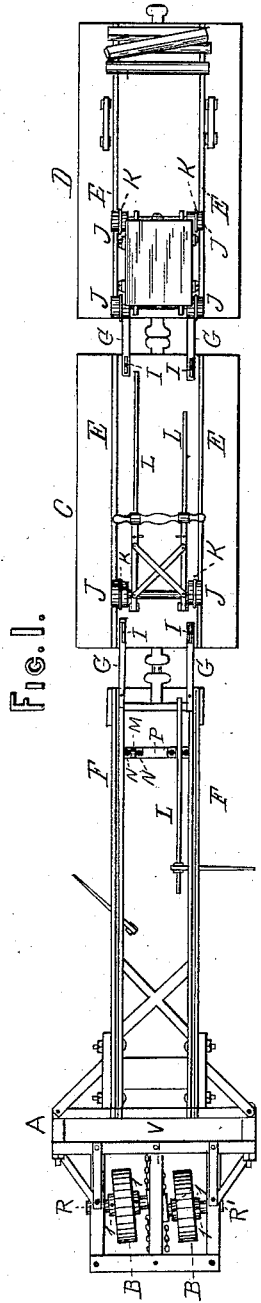
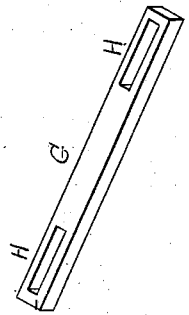
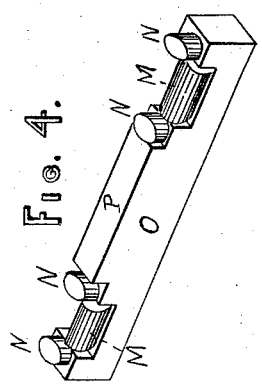
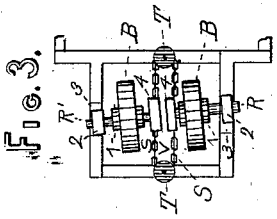
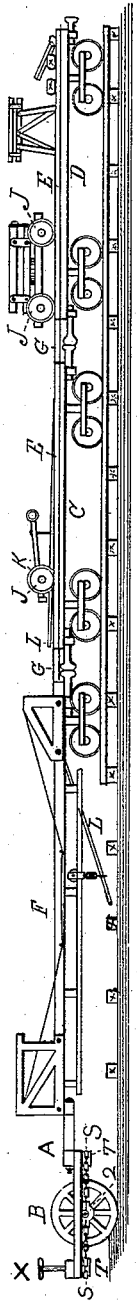
WITNESSES:
Arthur G. Morey.
Jackson Willsey
INVENTOR
Charles R. Goodman.
BY
G. L. Chapin
ATTORNEY

UNITED STATES PATENT OFFICE.

CHARLES R. GOODMAN, OF HAMMOND, INDIANA.

APPARATUS FOR LAYING RAILROAD-TRACKS.

SPECIFICATION forming part of Letters Patent No. 312,626, dated February 24, 1885.

Application filed March 29, 1884. (No model.)

*To all whom it may concern:*

Be it known that I, CHARLES R. GOODMAN, a citizen of the United States, residing at Hammond, in the county of Lake and State of Indiana, have invented new and useful Improvements in Apparatus for Laying Railroad-Tracks, of which the following is a specification, reference being had to the accompanying drawings, illustrating the invention, in which—

Figure 1 is a plan or top view of an apparatus embodying my improvements. Fig. 2 is a side elevation thereof; Fig. 3, an inverted view of the forward portion of the traction-truck; Fig. 4, a perspective view of the anti-friction rail-guide removed from the traction-truck; Fig. 5, a perspective view of the rail connecting the flat cars and truck.

The present invention is an improvement on a patent granted to me January 1, 1884, for "Apparatus for Laying Railroad-Track," No. 291,049.

The improvements, in brief, consist, first, in the novel construction of anti-friction rollers to guide the rails from the traction-truck to the road-bed; second, in means for guiding the traction-truck, consisting of two wheels journaled to independent axles, the boxes of the outer ends of the axles being pivoted to the truck-frame, and the boxes on their inner ends having a free movement, so as to be moved forward or backward by a chain attachment so connected thereto that when one axle is moved forward the other axle will be moved back, this movement holding the wheels at the same angles relative to each other.

A represents the traction-truck, and B the wheels thereof.

C D represent platform-cars, and E F the track upon which the rail and tie trucks run. Connecting-rails G are used to connect the cars and traction-truck, so that the rail and tie trucks can be moved on a continuous track from car to car and from car to traction-truck. These rails G are provided with slots H H, which engage pins I I on the cars and truck, and are thus held in position relative to the rails E F. The trucks which are to run on the rails E F G are provided with wheels J, which have central flanges, K, which run between the rails E G F G, and when the tread of the wheels on one side of the flange leaves the main rails E or F the tread on the opposite side of the flange runs on the connecting-rails G, and vice versa. The slots H are made long enough to allow for the movement of the cars to and from each other. This means of making a continuous track from one car to another also allows the cars to "round a curve" without disadvantage.

To guide rails L from the traction-truck to the road-bed, I employ an anti-friction guide firmly attached between the tracks F F, and composed of horizontal rollers M and vertical rollers N N, supported in a bed-piece, O. The flat part P may be used to support rails when desired. The lower ends of rollers N N are somewhat below the upper part of rollers M, so that the rails in their passage over the guide will come in contact with anti-friction surfaces only. The upper ends of the rollers N N are level with the surface of P, so that rails may be easily moved from the part P onto the rollers M.

To turn the wheels B to guide the traction-truck, I employ the following means: The wheels B B rotate on their axles R R', and are held in place by collars 1 1. The outer ends of the axles have boxes 2 2, which are respectively pivoted to plates 3 3 on the truck-frame. The boxes 4 4 on the inner ends of the axles are not attached to the truck-frame, but the frame-piece V rests on them. The ends of the boxes 4 4 on both sides of the axles are connected by chains S, which pass over pulleys T. By moving the chain S in one direction by means of ordinary turning-gear, X, the inner end of axle R' will be brought forward and the inner end of axle R will be drawn back, which will put the wheels B B in the same angle as shown at Figs. 1 and 3, and another movement of the chain S will move the wheels in another direction, but in the same angle relative to each other as may be desired to guide the traction-truck.

Having thus described my invention, I claim and desire to secure by Letters Patent—

1. The anti-friction rail-guide attached to the traction-truck, and composed of horizontal rollers M and vertical rollers N N, as and for the purpose specified.

2. The means for guiding the traction-truck, consisting of the wheels B B, axles R R', pivoted at their outer ends to the truck-frame, and their free inner ends connected, as shown, by chains, pulleys T T, and turning-gear X, as specified.

CHARLES R. GOODMAN.

Witnesses:
A. G. MOREY,
JACKSON WILLSEY.